Patented June 6, 1933

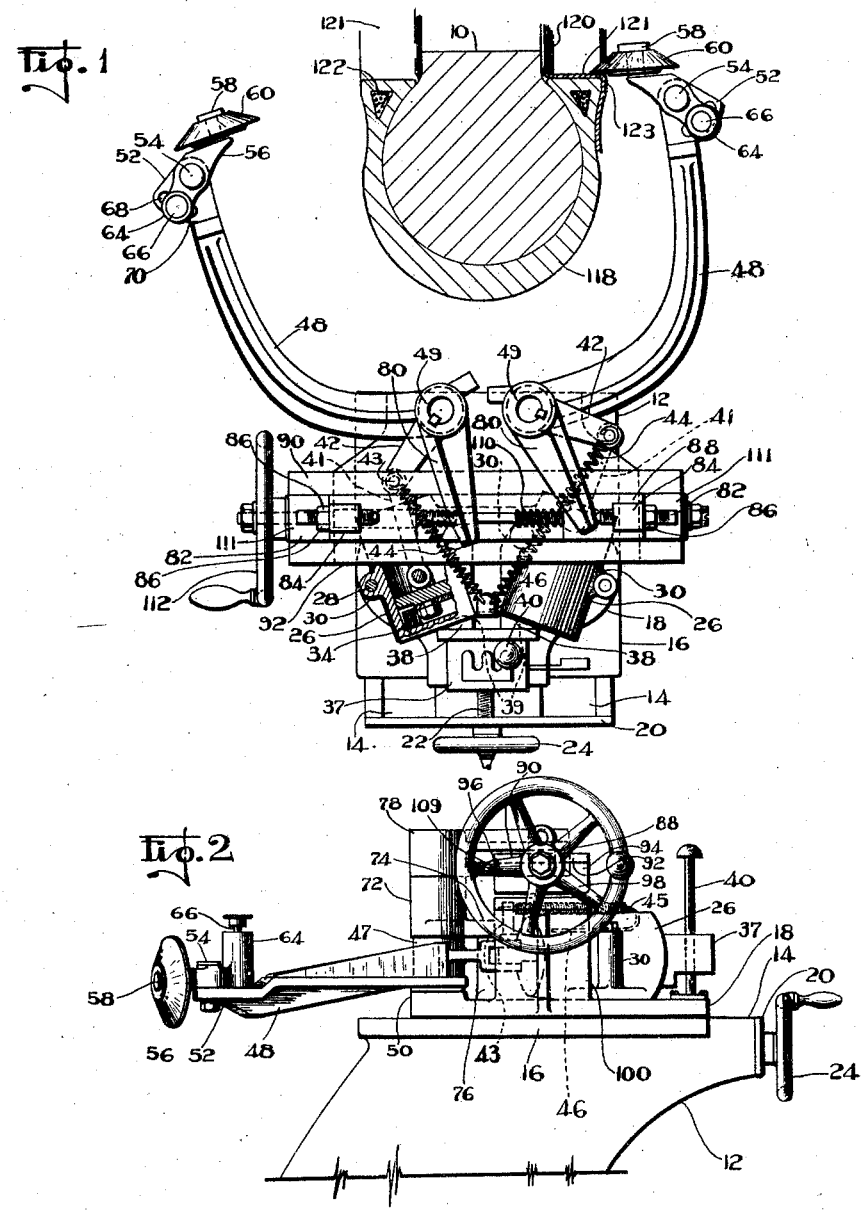

1,913,348

UNITED STATES PATENT OFFICE

EDWIN G. TEMPLETON, OF AKRON, OHIO, ASSIGNOR TO THE GOODYEAR TIRE & RUBBER COMPANY, OF AKRON, OHIO, A CORPORATION OF OHIO

STITCHER FOR TIRES

Application filed January 30, 1931. Serial No. 512,254.

This invention relates to apparatus for building pneumatic tires and it has particular relation to stitcher devices employed for rolling the various plies of material down upon the core upon which the tires are formed.

The object of the invention is to provide a device for accurately controlling the movement of a stitcher roller about the beads of a pneumatic tire.

One common method of constructing pneumatic tires for vehicles comprises the application of a plurality of plies of cord fabric to a revolving toroidal core which has approximately the same contour as the interior of the tires which are constructed thereupon. In the manufacture of tires upon these cores, the plies of rubberized fabric are disposed obout the core in the form of cylindrical bands and the margins thereof are then stitched downwardly over the sides of the core by means of suitable rollers. In such construction, the margins of the plies are stitched about rings or grommets termed "beads" which provide inextensible reinforcements for the inner peripheries of the tires.

This stitching operation is normally performed by means of a pair of arms having suitable stitcher rollers secured to the ends thereof. These arms are pivoted for swinging motion in such manner that the discs may be brought into contact with the plies of material upon the core and are actuated about their pivots by means of pistons, which are connected thereto by means of conventional connecting rods. The discs are moved inwardly and outwardly toward the axis of the tires by means of a suitable slide mechanism upon which the stitcher arms are supported, whereby to permit stitching upon all portions of the tire. Although this type of device is quite satisfactory for stitching the tread and side portions of the tires, it is not entirely satisfactory for stitching about the beads particularly that portion of the beads which constitutes the inner periphery of the tire and which extends parallel to the central axis of the latter. This is true because, as ordinarily constructed, no means is provided for controlling the rate of movement of the discs about the pivots upon which the supporting arms are mounted. Therefore, when the disc passes over the heels of the beads, the thrust of the pistons upon the arms swings the latter inwardly very suddenly rather than causing the disc slowly to traverse the bottom of the bead and thus stitch down the plies.

This invention comprises an adjustable stop device which may be actuated at the will of the operator to permit a gradual movement of the stitcher arm about its axis.

For a better understanding of the invention, reference may be had to the accompanying drawing, forming a part of the specification, of which:

Fig. 1 is a view, partially in cross-section and partially in plan, showing a stitcher mechanism embodying the invention; and Fig. 2 is a side elevational view of the mechanism shown in Fig. 1.

In practicing the invention, a rotatable and collapsible toroidal tire core 10 of conventional design is mounted in such position that the tread portion thereof is disposed in proximity to a stitcher supporting pedestal 12. This pedestal has guides 14 upon the upper surface thereof extending in parallelism with respect to the median plane of the core 10, and a suitable slide 16 is mounted thereon for movement toward or away from the core. The slide constitutes a movable support for a stitcher base 18, which is secured thereupon by means of bolts or other convenient fastening devices (not shown). For purposes of reciprocating the slide 16 and the mechanism secured thereto, a cross bar 20 is secured to the rear ends of the guides 14 and a horizontally disposed threaded shaft 22, having a hand wheel 24 upon the rear extremity thereof, is journaled therein. The forward portion of this shaft is threaded through the base 18, thus constituting means for actuating the stitcher mechanism.

A pair of cylinders 26 for receiving fluid under compression is secured upon the base 18 in slightly converging relation with respect to each other by means of bolts 28 extending through bosses 30 upon the sides of the cylinders. Fluid under compression is admitted to the rear ends of these cylinders by means of a valve structure 37 of conventional design which is secured upon bosses 38 having fluid conducting passages 39 therethrough upon the rear ends of the cylinders. The valve is operated by means of a lever 40 which is so connected that either piston may be operated independently of the other or, if desired, both pistons may be operated simultaneously. Pistons 34 are slidably mounted within these cylinders and are pivotally attached to connecting rods 41, the free extremities of which are pivotally connected to arms 42 by means of pins 43. These arms are integrally formed upon heads 47 of stitcher arms 48 that in turn are rigidly keyed upon vertically disposed shafts 49, which are journaled within bosses 50 upon the forward portion of the upper surface of the base plate 18.

Arms 42 are normally urged toward each other by means of tension springs 44 which are attached to upwardly projecting portions of pins 43 and to a lug 45 upon an angle plate 46 which is secured upon bosses 38 by means of suitable bolts. The stitcher arms 48 curve outwardly and forwardly upon opposite sides of the tire core 10, and the outer extremities thereof are provided with flattened portions 52 having studs 54 extending vertically therefrom. Arms 56 are pivotally mounted upon the studs intermediate of their ends and the forward ends thereof are provided with headed studs 58 which project obliquely therefrom at an angle with respect to the axis of the arms. Beveled stitcher discs 60 are rotatably secured upon the studs.

The rear extremities of the arms 56 are formed with vertical bosses 64, which are bored to receive spring actuated latch pins 66 that extend downwardly selectively into openings 68 and 70, thus latching the arms 56 at a predetermined angle of adjustment. The shafts 49 are also rotatably mounted within bearings 72, which are disposed immediately above the heads 47 and which are integrally formed upon a horizontally extending bracket 74. This bracket in turn is rigidly supported upon the upper end of a vertical bracket 76, which is integrally cast upon the base plate 18. The extremities of the shafts 49 are keyed within rotatable hubs 78 that rest upon the bearings 72 and which have arms 80 extending rearwardly therefrom. These arms, at their rear extremities, are limited in their pivotal movement by set screws 82, which are threaded into horizontal openings within brackets 84 and which are maintained in position by means of lock nuts 86. The brackets in turn are secured to slides 88 which reciprocate transversely of the slide 16, being arranged between guide plates 90 and 92 mounted upon the upper branches 94 and 96 of a channel member 98. The latter element in turn is supported upon vertical brackets 100 which project upwardly at the sides of the plate 18.

End portions 109 of the slides 88 are bored and threaded to receive a horizntal screw 110 having oppositely threaded portions and which is journaled in members 111 disposed between the ends of guide plates 90 and 92. The screw, at one end, is provided with a hand wheel 112 constituting means for imparting rotational movement thereto. By rotating this screw, the positions of the slides 88 may be so adjusted as to bring the ends of the set screws 82 into engagement with the arms 80 at any predetermined point in their path of operation.

In the manufacture of a pneumatic tire 118, it will be assumed that the main body of the carcass has been stitched upon the core 10 and that it is desirable to stitch a ply 120 downwardly and under the base 121 of a bead 122. This operation may readily be performed by rotating the hand wheel 24 to actuate the slide 16 inwardly toward the core until the discs 60 are brought into proper alignment with respect to the beads. Fluid under compression may now be admitted to the cylinders 26 to swing the ends of the stitcher arms 48 inwardly toward the tires and thus to bring the discs 60 into contact with the heels 123 of the beads 122. When the discs 60 reach approximately the position shown by the right hand disc in Fig. 1, further inward movement of the arms 48 is interrupted by engagement of the arms 80 with the set screws 82. However, by rotating the hand wheel 112, to back off the set screws, the arm 48 will move as permitted by the set screws and the stitcher discs 60 thus may be caused to traverse the bases 121 at any desired speed.

It is thus apparent that the mechanism constituting the subject matter of the invention comprises relatively simple means whereby the stitcher discs of an ordinary stitcher mechanism may be caused gradually to traverse the under side of the bead elements of a tire, a function which cannot readily be accomplished by the ordinary stitcher mechanism. Also, the mechanism is well adapted for stitching the tread portions and sidewalls of the tires.

Although I have illustrated the preferred form of the invention and have described that form in detail, it will be apparent to those skilled in the art that the invention is not so limited but that various modifications may be made therein without departing from the spirit of the invention or from the scope of the appended claims.

What I claim is:

1. A stitcher mechanism for the manufacture of pneumatic tires comprising a pair of pivotally mounted arms, stitcher discs mounted upon the extremities thereof, actuating pistons operatively connected to the arms, cylinders enclosing the pistons, means for admitting actuating fluid to the cylinders to operate the arms, and a separate movable means positively to control the rate of movement of the arms.

2. In combination, a rotatable tire building form, stitcher arms swingably disposed upon opposite sides thereof, projecting arms secured to the stitcher arms, a guideway disposed transversely with respect to the arms, a pair of slides disposed in the guideway, limit stops secured to the slides in position to engage the projecting arms, and means for gradually moving the stops whereby to permit the stitcher arms to approach the tire form.

3. In combination, a rotatable tire building form, stitcher arms swingably disposed upon opposite sides thereof, projecting arms secured to the stitcher arms, a guideway disposed transversely with respect to the arms, a pair of slides disposed in the guideway, limit stops secured to the slides in position to engage the projecting arms, and means for gradually moving the stops whereby to permit the stitcher arms to approach the tire form, said means comprising a screw interconnecting the slides.

4. A machine for constructing pneumatic tires comprising a rotatable tire building form, stitching mechanism mounted for movement toward said form, means for actuating said stitching mechanism, mechanism for arresting the movement of said stitching mechanism, and means for moving said arresting mechanism whereby to permit further movement of said stitching mechanism toward said form under control of said last named means.

5. A machine for constructing pneumatic tires comprising a rotatable tire building form, stitching mechanism mounted for movement toward said form, means for actuating said stitching mechanism, and means for arresting movement of said stitching mechanism, said last named means being operable to allow further movement of the stitching mechanism toward said form and to control such further movement.

6. A machine for constructing pneumatic tires comprising a rotatable tire building form, stitching mechanism mounted for movement toward said form, means for actuating said stitching mechanism, a movable stop member arranged to arrest movement of the stitching mechanism, and means cooperating with the stop member to gradually move it whereby to permit further movement of the stitching mechanism toward the form under control of said last named means.

7. In a machine of the character described, in combination, a rotatable tire building form, a stitcher arm swingably disposed with respect to the form, a second arm cooperating with said stitcher arm and movable therewith, means for swinging said stitcher arm toward said form, means arranged in the path of movement of said second arm for arresting movement of said stitcher arm, and mechanism for moving said arresting means whereby to permit further movement of said stitcher arm toward the form under control of said mechanism.

8. In a machine of the character described, in combination, a rotatable tire building form, a stitcher arm swingably disposed with respect to the form, a second arm cooperating with said stitcher arm and movable therewith, means for swinging said stitcher arm toward said form, and mechanism arranged in the path of said second arm for arresting movement of said stitcher arm, said mechanism being operable to allow further movement of said stitcher arm and to control such further movement.

9. In a machine of the character described, in combination, a rotatable tire building form, a stitcher arm swingably disposed with respect to the form, a second arm cooperating with said stitcher arm and movable therewith, means for swinging said stitcher arm toward said form, a movable stop member arranged in the path of movement of said second arm to arrest movement of said stitcher arm, and mechanism cooperating with the stop member to gradually move it whereby to permit further movement of the stitcher arm under control of said mechanism.

10. In a machine of the character described, in combination, a rotatable tire building form, a stitcher arm swingably disposed with respect to the form, a second arm cooperating with said stitcher arm and movable therewith, means for swinging said stitcher arm toward said form, a guideway disposed substantially transversely with respect to said arms, a slide disposed in the guideway, a stop member secured to the slide in a position to engage said second arm after operation of said means, and means for gradually moving the slide and stop member whereby to permit the stitcher arm to approach the form.

11. In a machine of the character described, in combination, a tire form, stitcher arms disposed upon opposite sides of said farm, means for moving said arms toward said form, a stop member arranged to arrest the movement of each arm, and means for simultaneously moving the stop members whereby to permit the stitcher arms to approach the form under control of said last named means.

12. In a stitcher mechanism, a pair of pivotally mounted arms, means for actuating at least one of said arms, mechanism for arresting the movement of said actuated arm, and means for moving said arresting mechanism whereby to permit further movement of said actuated arm under control of said last named means.

13. In a stitcher mechanism, a pair of pivotally mounted arms, means for actuating at least one of said arms, and means for arresting movement of said actuated arm, said last named means being operable to allow further movement of said actuated arm and to control such further movement.

14. In a stitcher mechanism, a pair of pivotally mounted arms, means for actuating at least one of said arms, a movable stop member arranged to arrest movement of said actuated arm, and means cooperating with the stop member to gradually move it whereby to permit further movement of said actuated arm under control of said last named means.

15. In a stitcher mechanism, a pair of pivotally mounted stitcher arms, a second arm cooperating with each of said stitcher arms and movable therewith, means for actuating at least one of said stitcher arms, means arranged in the path of movement of the second arm of the actuated stitcher arm for arresting movement of said actuated stitcher arm, and mechanism for moving said arresting means whereby to permit further movement of said actuated stitcher arm under control of said mechanism.

16. In a stitcher mechanism, a pair of pivotally mounted stitcher arms, a second arm cooperating with each of said stitcher arms and movable therewith, means for actuating at least one of said stitcher arms, and mechanism arranged in the path of movement of the second arm of the actuated stitcher arm for arresting movement of said actuated stitcher arm, said mechanism being operable to allow further movement of said actuated stitcher arm and to control such further movement.

17. In a stitcher mechanism, a pair of pivotally mounted stitcher arms, a second arm cooperating with each of said stitcher arms and movable therewith, means for actuating at least one of said stitcher arms, a movable stop member arranged in the path of movement of the second arm of the actuated stitcher arm to arrest movement of said actuated stitcher arm, and mechanism cooperating with the stop member to gradually move it whereby to permit further movement of the actuated stitcher arm under control of said mechanism.

18. In a stitcher mechanism, a pair of pivotally mounted stitcher arms, a second arm cooperating with each of said stitcher arms and movable therewith, means for actuating at least one of said stitcher arms, a guideway disposed substantially transversely with respect to said arms, a slide disposed in the guideway, a stop member secured to the slide in a position to engage the second arm of said actuated stitcher arm after operation of said means, and means for gradually moving the slide and the stop member to permit further movement of the actuated stitcher arm.

In witness whereof, I have hereunto signed my name.

Signed at Akron, in the county of Summit and State of Ohio, U. S. A., this 13th day of January, 1931.

EDWIN G. TEMPLETON.